Patented Oct. 9, 1945

2,386,735

UNITED STATES PATENT OFFICE 2,386,735

METHOD OF DIENE POLYMERIZATION

Alvin M. Borders, William D. Wolfe, and Harold J. Osterhof, Cuyahoga Falls, and Charles W. Walton, Stow, Ohio, assignors to Wingfoot Corporation, Akron, Ohio, a corporation of Delaware No Drawing. Application August 3, 1940, Serial No. 351,230

26 Claims. (Cl. 260—84.5)

This invention relates to an improved method of polymerization and to products thereof. More particularly, it relates to polymerization of monomeric materials to produce rubber-like masses in a rapid manner and with improved physical properties of the resulting products.

In the emulsion polymerization of monomeric materials, such as butadiene and acrylonitrile, the monomers are heated at a moderate temperature in an emulsion until a product of the desired properties is obtained. The temperature employed may be from 30 to 80° C. and is usually not over 50° C., consequently, the reaction is comparatively slow and a number of hours or days is required to effect the desired result. Also, the properties of the resulting rubber are not always what is desired particularly as to elasticity, extrudability and tensile strength. It has now been found that the rate of reaction can be speeded up with or without an attendant improvement in the physical properties of the product by the addition to the emulsion in which the polymerization is to take place of small amounts of a substance from the group consisting of aldehydes and cyanides, particularly aliphatic aldehydes and inorganic cyanides. The aldehyde exerts its greatest effect in the direction of speeding up the reaction, although there is probably also some modifiaction of the physical properties of the product, and the cyanide by itself is valued chiefly for the improvement in the quality of the product. Nevertheless, the cyanide when used in conjunction with the aldehyde has a marked effect in increasing the rate of reaction, indeed, the greatest reduction in polymerization time is obtained when both an aldehyde and a cyanide are present to cooperate with each other in promoting the polymerization. This effect is evidently due to some conjoint action between the two and is not merely an additive effect.

The aldehyde or cyanide or both is used in the presence of a polymerization catalyst from the group consisting of hydrogen peroxide and hydrogen peroxide generating compounds and, since the emulsion is usually an aqueous emulsion, the catalyst employed should be water-soluble, although if other than aqueous emulsions are employed, a catalyst which is soluble in such emulsion could be used. Suitable catalysts include sodium perborate, potassium perborate, calcium perborate or other water-soluble perborate, acetaldehyde-hydrogen-peroxide, sodium percarbonate, sodium peroxy phosphate, sodium peracetate, etc. Of the aldehydes, the aliphatic aldehydes are preferred, particularly those which are soluble in the reaction emulsion to a sufficient extent to be operative in promoting the polymerization. It has been found that those aliphatic aldehydes up to and including butyraldehyde are operative, although higher aldehydes may also be useful, but the best results have been obtained with formaldehyde and acetaldehyde, especially the latter.

The cyanide to be employed is usually an inorganic cyanide since solubility in the emulsion is also requisite here, at least to an amount sufficient to make the cyanide available for the purposes of the invention. Hydrogen cyanide can be used but usually a salt will be employed as a more convenient means of providing cyanide in the emulsion, sodium cyanide and potassium cyanide being readily available but other cyanides, such as calcium, barium and strontium cyanide also being available. The identity of the particular cyanide used is not important so long as hydrogen cyanide is present in the reaction and no polymerization inhibiting factor is introduced.

The promoters may be present in varying amounts in the emulsion, the amount of aldehyde present being quite flexible, the chief requirement being that the aldehyde be present in amount at least 0.1% based on the water present in the emulsion. However, best results are obtained when the amount of aldehyde is approximately 0.1 to 5% on the same basis. The amount of cyanide may be expressed in terms of molar concentration in the water phase of the emulsion and, expressed in this manner, may vary from approximately 0.01 to 0.25 molar concentration in the water phase of the emulsion. Here, again, it is preferred to operate in the range .005 to 0.10% molar concentration approximately. Where both a cyanide and an aldehyde are employed in conjunction to promote the polymerization and modify the properties of the polymer, each substance may be present in an amount falling within the respective ranges given above.

The method of the invention may be employed to promote the polymerization of the various monomers such as butadiene itself or a substituted butadiene and especially mixtures of two or more monomers such as a butadiene and a vinyl compound, particularly a mono vinyl compound, the invention having given excellent results in the copolymerization of a butadiene, such as butadiene itself, with an acrylonitrile such as acrylonitrile, methacrylonitrile and ethacrylonitrile. It may also be employed to promote the polymerization of a butadiene and a vinyl aromatic compound such as styrene.

The invention is illustrated by the following examples but it will be understood that the invention is not limited thereto but is of general applicability to the promotion of the polymerization of a butadiene by itself or with a vinyl compound.

Example 1

A series of polymerizations were conducted in an aqueous medium containing about 2½% of Aquarex D (sodium lauryl sulfate) as an emulsifier, carbon tetrachloride and sodium perborate as catalyst. The monomeric materials were butadiene and acrylonitrile. The temperature was maintained at about 38° C. Certain of these runs were made without the addition of either aldehyde or cyanide, others contained potassium cyanide in the quantities indicated, still others contained acetaldehyde as indicated and some were run with both cyanide and aldehyde. The results obtained were as follows:

| pH | Variables | | Time, hours | Yield, per cent | Opt. tens. | Elg. | Mod. |
|---|---|---|---|---|---|---|---|
| | CN, P.P.M. | CH₃CHO per cent on acrylonitrile | | | | | |
| 6.8 | 0 | 0 | 11.75 | 68.0 | 274 | 305 | 267 |
| 6.7 | 0 | 0.5 | 7 | 60.5 | 270 | 300 | 270 |
| 7.3 | 1,000 | 0 | 8 | 59.6 | 372 | 515 | 129 |
| 6.7 | 1,000 | .5 | 3.5 | 58.2 | 362 | 585 | 92 |
| 7.2 | 1,000 | .5 | 3.5 | 56.0 | 390 | 570 | 99 |

It will be noted that the time of polymerization was substantially reduced in the case of any of the additions and especially when both aldehyde and cyanide were added. The yields were of approximately the same order to give a proper comparison of the reaction time. It will also be noted that the tensile strength was measurably improved when cyanide was present.

Example 2

Another series of runs was conducted to show more particularly the effect of aldehyde and cyanide together as compared with cyanide alone, speeding up the rate of reaction. The aqueous emulsion contained butadiene and acrylonitrile in 50/50 proportions, there being also present 0.5% of NaBO₃.4H₂O. The hydrogen ion concentration was maintained at pH 6.5–6.8 and the temperature was 35° C.

| KCN, per cent | Per cent CH₃CHO | Time required 65% yield, hours | Tensile, kgs./cm.² | Elong., per cent | Modulus 300% |
|---|---|---|---|---|---|
| 0 | 0.2 | 13 | 260 | 300 | 260 |
| 0.1 | ---- | 22½ | 368 | 475 | 163 |
| 0.1 | 0.2 | 2¼ | 304 | 440 | 160 |

It will be observed that the same amount of cyanide resulted in a greatly increased yield when 0.2% of acetaldehyde was present as compared with results when no aldehyde was present.

Example 3

The following example is intended to show more particularly the effect of cyanide on the physical properties of the product, although it also shows the extraordinary acceleration of the polymerization when both cyanide and aldehyde are present. Butadiene and acrylonitrile were copolymerized in equal proportions in an aqueous emulsion containing 0.5% of sodium perborate. The hydrogen ion concentration was maintained at pH 6.5. Potassium cyanide and acetaldehyde were added in the proportions indicated and the following results were obtained.

| No CH₃CHO, molar concentration of KCN | Percent polymer yield @ 5 hrs. 35° C. |
|---|---|
| 0 | 9.0 |
| 0.005 | 28.0 |
| 0.01 | 34.0 |
| 0.02 | 41.0 |

| 0.2% CH₃CHO present in each molar conc. of KCN | Percent polymer yield @ 5 hrs. |
|---|---|
| 0. | 18.0 |
| 0.005 | 62.0 |
| 0.010 | 72.5 |
| 0.015 | 69.0 |
| 0.020 | 66.0 |
| 0.030 | 60.0 |
| 0.045 | 33.0 |

It will first be observed that potassium cyanide alone as compared with acetaldehyde alone gave a product of greatly increased tensile strength while at the same time the elongation was high and the modulus was low, indicating a soft and useful rubber. When potassium cyanide and acetaldehyde were both present in the same proportions as they were individually employed alone, the physical properties were substantially as good as those obtained with cyanide alone but the time of reaction was greatly reduced.

Example 4

Illustrating the effect of varying amounts of potassium cyanide are the following runs. It will be seen that the rate of reaction increases with increasing amounts of cyanide to a maximum and then falls off until excess of cyanide completely inhibits the polymerization. The runs were conducted at a hydrogen ion concentration including pH 7 and pH 7.2.

| Variables | | Time, hrs. @ 35° C. | Yield, percent |
|---|---|---|---|
| KCN, P.P.M. | Aldehyde, percent | | |
| 0 | 0 | 5.25 | 10.1 |
| 0 | 0 | 22–25 | 86.1 |
| 0 | 0.5 | 16.5 | 88.1 |
| 1,000 | 0.0 | 11.5 | 55.3 |
| 2,500 | 0 | 7.25 | 48.3 |
| 5,000 | 0 | 25 | 0 |
| 1,000 | 0.17 | 4.25 | 71.5 |
| 1,000 | 0.5 | 5.0 | 92.0 |
| 2,500 | 0.50 | 3.5 | 73.7 |

Example 5

Showing the effect of aldehyde upon still another type of copolymer is the following relating to the copolymerization of butadiene and styrene in equal proportions.

| Percent CH₃CHO | Time hrs. @ 34° C. | Percent yield of polymer | Tens., kgs./cm.² | Elong., percent | Modulus, kgs./cm.² |
|---|---|---|---|---|---|
| 0 | 17 | 79 | 192 | 365 | 134 |
| 0 | 16 | 82 | 204 | 345 | 167 |
| 0.5 | 17 | 75 | 228 | 545 | 82 |
| 0.5 | 18½ | 76 | 234 | 540 | 76 |
| 2.5 | 25 | 73 | 240 | 475 | 104 |

These runs show that the physical properties of the butadiene styrene rubber are measurably improved when as little as 0.5% of acetaldehyde is present.

Example 6

The polymerization of butadiene and styrene together is greatly accelerated when both cyanide and aldehyde are present, similarly to butadiene-acrylonitrile copolymerizations. Thus, butadiene and styrene in equal proportions are emulsified in an emulsion containing sodium perborate and buffered at pH 7. Varying amounts of potassium cyanide or acetaldehyde were added and also both of these substances were employed together. The following results are tabulated:

| Percent KCN | Percent $CH_3CHO$ | Polymer yield percent at 24 hrs. (35° C.) |
|---|---|---|
| 0 | 0 | 10 |
| 0 | 0.2 | 18 |
| 0.1 | 0 | 15 |
| 0.1 | 0.2 | 54 |

It will be observed that the percentage yield at the end of 24 hours was greatly increased when both cyanide and aldehyde were present, as compared with the results obtained with either of these substances alone or when neither was employed.

The process of the invention is applicable to emulsion polymerizations of a butadiene and a vinyl compound, as mentioned above, and the cyanide or aldehyde or both have been found to give improvement in greater reaction and physical properties of the synthetic rubbers in the presence of hydrogen peroxide or a hydrogen peroxide generating catalyst, such as sodium perborate. There will also be present in such emulsions an emulsifying agent, as will be apparent, and other aids to polymerization may also be present such as halogen compounds, e. g., carbon tetrachloride. The temperature of the polymerization will vary between 30 and 80° C. but usually a temperature in the neighborhood of say 35-40° is employed. The monomers may be present in whatever proportions are desired, usually each of two constituents being present in amount from 25-75% of the total monomers. However, the monomers may be present in greater or less proportions than this, the process being useful for the formation of any copolymer of the class described which may be found useful. Of course, the process may also be used for the polymerization of individual monomers, such as the polymerization of butadiene by itself or of a substituted butadiene by itself or of acrylonitrile alone.

The hydrogen ion concentration of the emulsion may vary from pH 3 to pH 9 but best results are obtained when between the limits of pH 4 and pH 8.

While there has been described above the preferred embodiment of the invention, it will be apparent to those skilled in the art that various modifications and changes may be made therein without departing from the spirit of the invention or from the scope of the appended claims.

We claim:

1. A method of making rubber-like masses which comprises polymerizing a butadiene and a vinyl compound in an aqueous emulsion in the presence of a catalyst from the group consisting of hydrogen peroxide and hydrogen peroxide generating compounds and acetaldehyde.

2. A method of making rubber-like masses which comprises polymerizing a butadiene and a vinyl compound in an aqueous emulsion in the presence of a catalyst from the group consisting of hydrogen peroxide and hydrogen peroxide generating compounds and a water-soluble cyanide.

3. A method of making rubber-like masses which comprises polymerizing a butadiene and a vinyl compound in an aqueous emulsion in the presence of a catalyst providing hydrogen peroxide in the emulsion and hydrogen cyanide.

4. A method of making rubber-like masses which comprises polymerizing a butadiene and a vinyl compound in an aqueous emulsion in the presence of a catalyst from the group consisting of hydrogen peroxide and hydrogen peroxide generating compounds and in the presence of acetaldehyde and hydrogen cyanide.

5. A method of making rubber-like masses which comprises polymerizing a butadiene and a vinyl compound in an aqueous emulsion in the presence of an alkali metal perborate, a saturated aldehyde having not more than four carbon atoms and a water-soluble cyanide.

6. A method of making rubber-like masses which comprises polymerizing a butadiene and a vinyl compound in an aqueous emulsion in the presence of a catalyst providing hydrogen peroxide in the emulsion and at least 0.1%, based on the water present in the emulsion, of a saturated aldehyde having not more than four carbon atoms.

7. A method of making rubber-like masses which comprises polymerizing a butadiene and a vinyl compound in an aqueous emulsion in the presence of a catalyst from the group consisting of hydrogen peroxide and hydrogen peroxide generating compounds and from about 0.1% to about 5%, based on the water present in the emulsion, of a saturated aldehyde having not more than four carbon atoms.

8. A method of making rubber-like masses which comprises polymerizing a butadiene and a vinyl compound in an aqueous emulsion in the presence of a catalyst providing hydrogen peroxide in the emulsion and a water-soluble cyanide in amount from about .001 to about 0.25 molar concentration in the water phase of the emulsion.

9. A method of making rubber-like masses which comprises polymerizing a butadiene and a vinyl compound in an aqueous emulsion in the presence of a catalyst from the group consisting of hydrogen peroxide and hydrogen peroxide generating compounds and a water-soluble cyanide in amount from about .005 to about 0.10 molar concentration in the water phase of the emulsion.

10. A method of making rubber-like masses which comprises polymerizing butadiene and acrylonitrile in an aqueous emulsion in the presence of sodium perborate and acetaldehyde.

11. A method of making rubber-like masses which comprises polymerizing butadiene and acrylonitrile in an aqueous emulsion in the presence of sodium perborate and hydrogen cyanide.

12. A method of making rubber-like masses which comprises polymerizing butadiene and acrylonitrile in an aqueous emulsion in the presence of sodium perborate, acetaldehyde and hydrogen cyanide.

13. A method of polymerization which comprises polymerizing a butadiene and a vinyl compound in an aqueous emulsion containing a catalyst providing hydrogen peroxide in the emulsion and also containing a water-soluble cyanide and a saturated aldehyde having not more than four carbon atoms.

14. A method of polymerization which comprises polymerizing a butadiene and a mono vinyl compound in an aqueous emulsion containing a catalyst providing hydrogen peroxide in the emulsion and also containing a water-soluble cyanide and a saturated aldehyde having not more than four carbon atoms.

15. A method of polymerization which comprises polymerizing a butadiene and an acrylonitrile in an aqueous emulsion containing a catalyst providing hydrogen peroxide in the emulsion and also containing a water-soluble cyanide and a saturated aldehyde having not more than four carbon atoms.

16. A method of polymerization which comprises polymerizing butadiene and acrylonitrile in an aqueous emulsion containing a catalyst providing hydrogen peroxide in the emulsion and also containing a water-soluble cyanide and a saturated aldehyde having not more than four carbon atoms.

17. A method of polymerization which comprises polymerizing a butadiene and a vinyl aromatic compound in an aqueous emulsion containing a catalyst providing hydrogen peroxide in the emulsion and also containing a water-soluble cyanide and a saturated aldehyde having not more than four carbon atoms.

18. A method of polymerization which comprises polymerizing a butadiene and a vinyl compound in an aqueous emulsion containing a catalyst providing hydrogen peroxide in the emulsion and also containing a water-soluble cyanide.

19. A method of polymerization which comprises polymerizing a butadiene and a mono vinyl compound in an aqueous emulsion containing a catalyst providing hydrogen peroxide in the emulsion and also containing a water-soluble cyanide.

20. A method of polymerization which comprises polymerizing a butadiene and an acrylonitrile in an aqueous emulsion containing a catalyst providing hydrogen peroxide in the emulsion and also containing a water-soluble cyanide.

21. A method of polymerization which comprises polymerizing butadiene and acrylonitrile in an aqueous emulsion containing a catalyst providing hydrogen peroxide in the emulsion and also containing a water-soluble cyanide.

22. A method of polymerization which comprises polymerizing a butadiene and a vinyl compound in an aqueous emulsion containing a catalyst providing hydrogen peroxide in the emulsion and also containing a saturated aldehyde having not more than four carbon atoms.

23. A method of polymerization which comprises polymerizing a butadiene and a mono vinyl compound in an aqueous emulsion containing a catalyst providing hydrogen peroxide in the emulsion and also containing a saturated aldehyde having not more than four carbon atoms.

24. A method of polymerization which comprises polymerizing a butadiene and an acrylonitrile in an aqueous emulsion containing a catalyst providing hydrogen peroxide in the emulsion and also containing a saturated aldehyde having not more than four carbon atoms.

25. A method of polymerization which comprises polymerizing butadiene and acrylonitrile in an aqueous emulsion containing a catalyst providing hydrogen peroxide in the emulsion and also containing a saturated aldehyde having not more than four carbon atoms.

26. A method of polymerization which comprises polymerizing butadiene and styrene in an aqueous emulsion containing a catalyst providing hydrogen peroxide in the emulsion and also containing a water-soluble cyanide and a saturated aldehyde having not more than four carbon atoms.

ALVIN M. BORDERS.
WILLIAM D. WOLFE.
HAROLD J. OSTERHOF.
CHARLES W. WALTON.